US009424352B2

(12) United States Patent
Johnson

(10) Patent No.: US 9,424,352 B2
(45) Date of Patent: Aug. 23, 2016

(54) VIEW ITEM RELATED SEARCHES

(71) Applicant: eBay Inc., San Jose, CA (US)

(72) Inventor: Brian Scott Johnson, Campbell, CA (US)

(73) Assignee: eBay Inc., San Jose, CA (US)

( * ) Notice: Subject to any disclaimer, the term of this patent is extended or adjusted under 35 U.S.C. 154(b) by 736 days.

(21) Appl. No.: 13/722,680

(22) Filed: Dec. 20, 2012

(65) Prior Publication Data
US 2014/0181136 A1 Jun. 26, 2014

(51) Int. Cl.
G06F 17/30 (2006.01)

(52) U.S. Cl.
CPC .............. G06F 17/30864 (2013.01)

(58) Field of Classification Search
None
See application file for complete search history.

(56) References Cited

U.S. PATENT DOCUMENTS

| 7,007,014 | B2* | 2/2006 | Liu .................. G06F 17/30864 705/15 |
| 7,685,195 | B2* | 3/2010 | Pope ................ G06F 17/30864 705/37 |
| 7,752,201 | B2* | 7/2010 | Anderson ......... G06F 17/30864 707/713 |
| 8,392,435 | B1* | 3/2013 | Yamauchi ........... G06F 17/3064 707/749 |
| 8,572,100 | B2* | 10/2013 | Hamilton .......... G06F 17/30864 707/750 |
| 8,694,529 | B1* | 4/2014 | Hotchkies ......... G06F 17/30693 707/766 |
| 2006/0242564 | A1* | 10/2006 | Egger .............. G06F 17/30321 715/210 |
| 2007/0083762 | A1* | 4/2007 | Martinez ........... G06F 17/30026 713/176 |
| 2008/0250026 | A1* | 10/2008 | Linden ............. G06F 17/30867 |
| 2009/0094221 | A1* | 4/2009 | Cameron ............ G06F 17/3064 |
| 2009/0240683 | A1* | 9/2009 | Lazier ............. G06F 17/30864 |
| 2010/0262495 | A1* | 10/2010 | Dumon ............ G06F 17/30979 705/14.54 |
| 2011/0035403 | A1* | 2/2011 | Ismalon ............. G06F 17/3064 707/769 |
| 2012/0036123 | A1* | 2/2012 | Hasan .............. G06F 17/30386 707/723 |
| 2013/0080423 | A1* | 3/2013 | Parikh ................... G06Q 30/02 707/722 |

OTHER PUBLICATIONS

Applications of Data Mining to Electronic Commerce, vol. 5, Nos. 1/2 (2001), retrieved on Mar. 3, 2016, retrieved from the internet <URL: http://link.springer.com/chapter/10.1007/978-1-4615-1627-9_4>.*

* cited by examiner

Primary Examiner — Tyler Torgrimson
(74) Attorney, Agent, or Firm — Schwegman, Lundberg & Woessner, P.A.

(57) ABSTRACT

A system and method of providing related search queries are disclosed. A new item listing is identified based on a determination that the new item listing lacks a predetermined minimum amount of clickstream data. Similar item listings for the new item listing is determined from a plurality of old item listings based on at least one item feature of the new item listing and the plurality of old item listings. The plurality of old item listings comprises live item listings and completed item listings. Each old item listing has at least the predetermined minimum amount of clickstream data. Related search queries of the similar item listings are associated with the new item listing. The related search queries for the new item listing are provided along with the new item listing to a user on a client device.

14 Claims, 13 Drawing Sheets

600 ⤴

RANKING OF QUERIES FOR ITEM LISTING 2

| RANK | QUERY | USER ACTIONS |
|---|---|---|
| 1. | Query 2 | V, P + V |
| 2. | Query 3 | V, W + V |
| 3. | Query 1 | V |
| 4. | Query 4 | No User Action |
| ⋮ | ⋮ | ⋮ |

DICTIONARY FOR SEARCH QUERIES

| ORIGINAL SEARCH QUERY | RELATED SEARCH QUERIES |
|---|---|
| Query 1 | Query 2, Query 3, ... |
| Query 2 | Query 3, Query 1, ... |
| Query 3 | Query 2, Query 1, ... |
| ⋮ | ⋮ |

RELATED SEARCH QUERIES FOR ITEM LISTINGS

| | ITEM LISTINGS | RELATED SEARCH QUERIES |
|---|---|---|
| Similar to Item Listing 4 → | ITEM LISTING 1 (LIVE) | Query 2, Query 3 |
| | ITEM LISTING 2 (LIVE) | Query 4, Query 1 |
| Similar to Item Listing 4 → | ITEM LISTING 3 (COMPLETED) | Query 5, Query 6 |
| | ITEM LISTING 4 (NEW) | No Related Search Queries |

RELATED SEARCH QUERIES FOR ITEM LISTINGS

| | ITEM LISTINGS | RELATED SEARCH QUERIES |
|---|---|---|
| Similar to Item Listing 4 → | ITEM LISTING 1 (LIVE) | Query 2, Query 3 |
| | ITEM LISTING 2 (LIVE) | Query 4, Query 1 |
| Similar to Item Listing 4 → | ITEM LISTING 3 (COMPLETED) | Query 5, Query 6 |
| | ITEM LISTING 4 (NEW) | Query 2, Query 3, Query 5, Query 6 |

*FIG. 12B*

VIEW ITEM RELATED SEARCHES

TECHNICAL FIELD

The present application relates generally to the technical field of search query processing, and, in various embodiments, to systems and methods of providing related search queries.

BACKGROUND

Electronic commerce (e-commerce) websites may allow a user to view items. A user may want to be able to search for items similar to the item currently being viewed.

BRIEF DESCRIPTION OF THE DRAWINGS

Some embodiments of the present disclosure are illustrated by way of example and not limitation in the figures of the accompanying drawings, in which like reference numbers indicate similar elements and in which:

FIG. 6 illustrates an example embodiment of a ranking of queries for an item listing;

FIG. 7 illustrates an example embodiment of a dictionary of related queries for given queries;

FIGS. 12A-12B illustrate an example embodiment of associating related queries for similar item listings with a new item listing;

DETAILED DESCRIPTION

Figure 1:
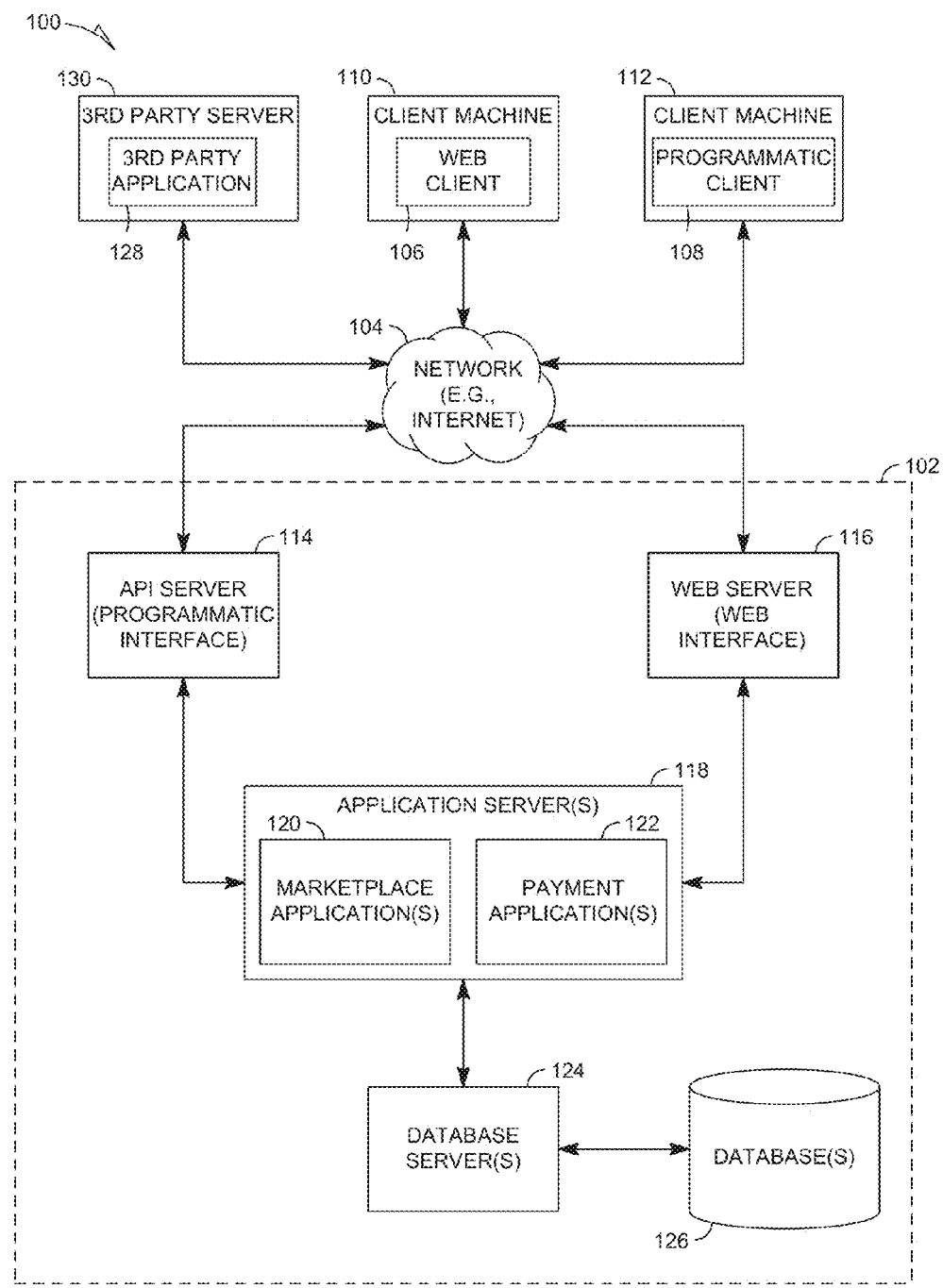
FIG. 1 is a block diagram depicting a network architecture of a system, according to some embodiments, having a client-server architecture configured for exchanging data over a network.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

The present disclosure describes a system and method of providing search queries that are related to an original search query. The related search queries may be provided to a user that submits the original search query. In some embodiments, the related search queries may be presented on a search results page that comprises the results (e.g., item listings) of the original search query.

In some embodiments, a system comprises at least one processor and a related query determination module. The related query determination module may be executable by the at least one processor and be configured to receive log file data from a data store. The log file data may comprise original search queries and clickstream data for a plurality of e-commerce item listings. The plurality of e-commerce item listings may comprise live item listings and completed item listings. The related query determination module may also be configured to determine at least one related search query for at least one of the original search queries based on clickstream data for at least one of the live item listings and clickstream data for at least one of the completed item listings.

In some embodiments, determining the at least one related search query may comprise performing a bipartite graph analysis of the original search queries and clickstream data in the log file data. In some embodiments, determining the at least one related search query may comprise forming an aggregation of search queries for each of the e-commerce item listings in the plurality of e-commerce item listings. The aggregation of search queries for an e-commerce item listing may be formed from the original search queries and be based on clickstream data between the original search queries and the e-commerce item listing. Determining the at least one related search query may further comprise ranking the search queries in the aggregation of search queries for each of the e-commerce item listings in the plurality of e-commerce item listings. In some embodiments, the ranking of the search queries in the aggregation of search queries is based, at least in part, on user actions reflected in the clickstream data. In some embodiments, the ranking of the search queries in the aggregation of search queries is based, at least in part, on a frequency of user actions reflected in the clickstream data. In some embodiments, the user actions reflected in the clickstream data comprise a user viewing an e-commerce item listing and a user submitting an offer to purchase an item in the e-commerce item listing.

In some embodiments, the system further comprises a navigation module. The navigation module may be executable by at least one processor and configured to receive a search query from a user on a client device. The search query may match one of the original search queries. The navigation module may also be configured to retrieve at least one of the related search queries determined for the matched one of the original search queries, and to provide the retrieved related search queries to the user on the client device.

In some embodiments, the related query determination module may be further configured to assign at least one of the determined related search queries to the at least one of the original search queries in a dictionary. In some embodiments, the related query determination module may be further configured to determine that a similarity level between a recall set for one of the related search queries and a recall set for one of the original search queries exceeds a predetermined threshold, and to omit the one of the related search queries for which the similarity level exceeds the predetermined threshold from being assigned to an original search query in the dictionary in response to the similarity level exceeding the predetermined threshold.

In some embodiments, a computer-implemented method comprises receiving log file data from a data store. The log file data may comprise original search queries and clickstream data for a plurality of e-commerce item listings. The plurality of e-commerce item listings may comprise live item listings and completed item listings. At least one related search query may be determined for at least one of the original search queries based on clickstream data for at least one of the live item listings and clickstream data for at least one of the completed item listings.

In some embodiments, determining at least one related search query comprises performing a bipartite graph analysis of the original search queries and clickstream data in the log file data. In some embodiments, determining at least one related search query comprises forming an aggregation of search queries for each of the e-commerce item listings in the plurality of e-commerce item listings. The aggregation of search queries for an e-commerce item listing may be formed from the original search queries and be based on clickstream data between the original search queries and the e-commerce item listing. The search queries in the aggregation of search queries may be ranked for each of the e-commerce item listings in the plurality of e-commerce item listings. In some embodiments, the ranking of the search queries in the aggregation of search queries is based, at least in part, on user actions reflected in the clickstream data. In some embodiments, the ranking of the search queries in the aggregation of search queries is based, at least in part, on a frequency of user actions reflected in the clickstream data. In some embodiments, the user actions reflected in the clickstream data comprise a user viewing an e-commerce item listing and a user submitting an offer to purchase an item in the e-commerce item listing.

In some embodiments, a search query may be received from a user on a client device. The search query may match one of the original search queries. At least one of the related search queries determined for the matched one of the original search queries may be provided to the user on the client device.

In some embodiments, at least one of the determined related search queries may be assigned to the at least one of the original search queries in a dictionary. In some embodiments, a similarity level between a recall set for one of the related search queries and a recall set for one of the original search queries may be determined to exceed a predetermined threshold, and the one of the related search queries for which the similarity level exceeds the predetermined threshold may be omitted from being assigned to an original search query in the dictionary in response to the similarity level exceeding the predetermined threshold.

The present disclosure also describes a system and method of providing related search queries for an item listing. The related search queries may be provided to a user being presented with the item listing. In some embodiments, the related search queries may be displayed on an item listing page that comprises an item listing.

In some embodiments, a system comprises at least one processor and a related query determination module. The related query determination module may be executable by the at least one processor and be configured to identify a new e-commerce item listing based on a determination that the new e-commerce item listing lacks a predetermined minimum amount of clickstream data. The related query determination module also may be configured to determine similar e-commerce item listings for the new e-commerce item listing from a plurality of old e-commerce item listings based on at least one item feature of the new e-commerce item listing and the plurality of old e-commerce item listings. The plurality of old e-commerce item listings may comprise live e-commerce item listings and completed e-commerce item listings. Each old e-commerce item listing may have at least the predetermined minimum amount of clickstream data. The related query determination module may further be configured to associate related search queries of the similar e-commerce item listings with the new e-commerce item listing, and to provide, to a user on a client device, the related search queries for the new e-commerce item listing along with the new e-commerce item listing.

In some embodiments, the at least one item feature comprises category data, title data, or structured item data, image data, seller data, or price data. In some embodiments, the related query determination module may be further configured to receive log file data from a data store. The log file data may comprise original search queries and clickstream data for the old e-commerce item listings. The related query determination module may also be configured to determine the related search queries for each of the old e-commerce item listings based on the original search queries and the clickstream data for the old e-commerce item listings. In some embodiments, determining the related search queries for each of the old e-commerce item listings comprises forming an aggregation of search queries for each of the old e-commerce item listings. The aggregation of search queries for an old e-commerce item listing may be formed from the original search queries and be based on clickstream data between the original search queries and the old e-commerce item listing. Determining the related search queries for each of the old e-commerce item listings may also comprise ranking the search queries in the aggregation of search queries for each of the old e-commerce item listings. In some embodiments, the ranking of the search queries in the aggregation of search queries may be based, at least in part, on user actions reflected in the clickstream data. In some embodiments, the ranking of the search queries in the aggregation of search queries may be based, at least in part, on a frequency of user actions reflected in the clickstream data. In some embodiments, the user actions reflected in the clickstream data may comprise a user viewing an item listing and a user submitting an offer to purchase an item in the item listing.

In some embodiments, a computer-implemented method comprises identifying a new e-commerce item listing based on a determination that the new e-commerce item listing lacks a predetermined minimum amount of clickstream data, and determining similar e-commerce item listings for the new e-commerce item listing from a plurality of old e-commerce item listings based on at least one item feature of the new e-commerce item listing and the plurality of old e-commerce item listings. The plurality of old e-commerce item listings may comprise live e-commerce item listings and completed e-commerce item listings. Each old e-commerce item listing may have at least the predetermined minimum amount of clickstream data. The method may also comprise associating related search queries of the similar e-commerce item listings with the new e-commerce item listing, and providing, to a user on a client device, the related search queries for the new e-commerce item listing along with the new e-commerce item listing.

In some embodiments, the at least one item feature comprises category data, title data, or structured item data, image data, seller data, or price data. In some embodiments, the method further comprises receiving log file data from a data store. The log file data may comprise original search queries and clickstream data for the old e-commerce item listings. The method may also comprise determining the related search queries for each of the old e-commerce item listings based on the original search queries and the clickstream data for the old e-commerce item listings. In some embodiments, determining the related search queries for each of the old e-commerce item listings may comprise forming an aggregation of search queries for each of the old e-commerce item listings. The aggregation of search queries for an old e-commerce item listing may be formed from the original search queries and may be based on clickstream data between the original search queries and the old e-commerce item listing. Determining the related search queries for each of the old e-commerce item listings may also comprise ranking the search queries in the aggregation of search queries for each of the old e-commerce item listings. In some embodiments, the ranking of the search queries in the aggregation of search queries may be based, at least in part, on user actions reflected in the clickstream data. In some embodiments, the ranking of the search queries in the aggregation of search queries may be based, at least in part, on a frequency of user actions reflected in the clickstream data. In some embodiments, the user actions reflected in the clickstream data may comprise a user viewing an item listing and a user submitting an offer to purchase an item in the item listing.

In some embodiments, a non-transitory machine-readable storage device may store a set of instructions that, when executed by at least one processor, causes the at least one processor to perform the operations discussed within the present disclosure.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or a Wide Area Network (WAN)) to one or more clients. FIG. 1 illustrates, for example, a web client 106 (e.g., a browser, such as the Internet Explorer browser developed by Microsoft Corporation of Redmond, Wash. State) and a programmatic client 108 executing on respective client machines 110 and 112.

An API server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more database servers 124 that facilitate access to one or more databases 126.

The marketplace applications 120 may provide a number of marketplace functions and services to users who access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the embodiments are, of course not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Figure 2:
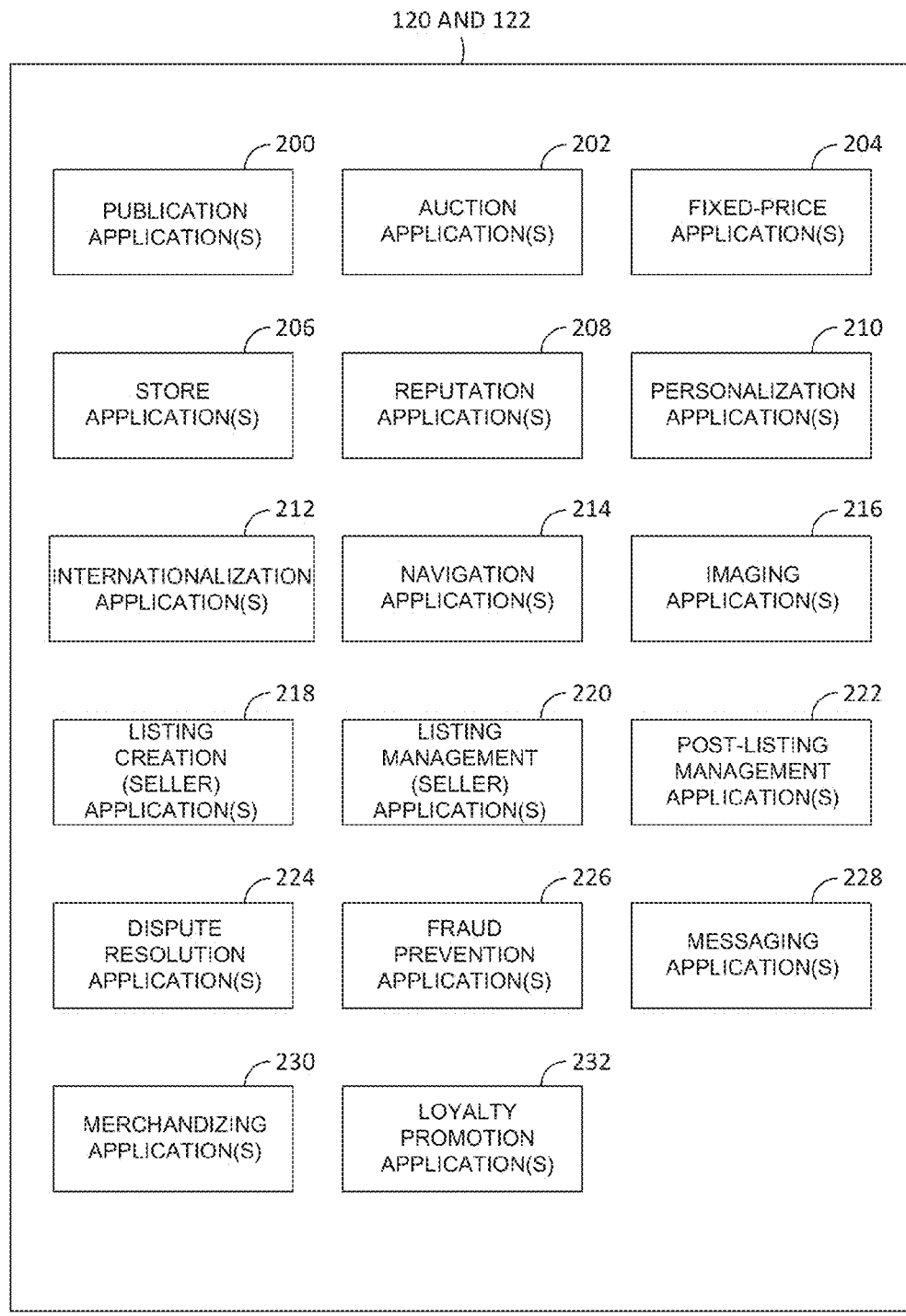
FIG. 2 is a block diagram depicting a various components of a network-based publisher, according to some embodiments.

FIG. 2 is a block diagram illustrating multiple applications 120 and 122 that, in one example embodiment, are provided as part of the networked system 102. The applications 120 and 122 may be hosted on dedicated or shared server machines (not shown) that are communicatively coupled to enable communications between server machines. The applications 120 and 122 themselves are communicatively coupled (e.g., via appropriate interfaces) to each other and to various data sources, so as to allow information to be passed between the applications 120 and 122 or so as to allow the applications 120 and 122 to share and access common data. The applications 120 and 122 may furthermore access one or more databases 126 via the database servers 124.

The networked system 102 may provide a number of publishing, listing, and price-setting mechanisms whereby a setter may list (or publish information concerning) goods or services for sale, a buyer can express interest in or indicate a desire to purchase such goods or services, and a price can be set for a transaction pertaining to the goods or services. To this end, the marketplace applications 120 and 122 are shown to include at least one publication application 200 and one or more auction applications 202, which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives, and features that are specific and personalized to a relevant seller.

Reputation applications 208 allow users who transact, utilizing the networked system 102, to establish, build, and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user (for example, through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace or may be customized (or internationalized) presentations of a common underlying marketplace. The networked system 102 may accordingly include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application 214) may enable key word searches of listings published via the networked system 102. A browse application may allow users to browse various category, catalogue, or inventory data structures according to which listings may be classified within the networked system 102. Various other navigation applications 214 may be provided to supplement the search and browsing applications.

In order to make listings, available via the networked system 102, as visually informing and attractive as possible, the applications 120 and 122 may include one or more imaging applications 216, which users may utilize to upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller conveniently to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102, such as, for example, messages advising users regarding the status of listings at the networked system 102 (e.g., providing "outbid" notices to bidders during an auction process or to providing promotional and merchandising information to users). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, Worldwide Interoperability for Microwave Access (WIMAX)) networks.

Merchandising applications 230 support various merchandising functions that are made available to setters to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotions applications 232. For example, a buyer may earn loyalty or promotion points for each transaction established and/or concluded with a particular seller, and be offered a reward for which accumulated loyalty points can be redeemed.

Figure 3:
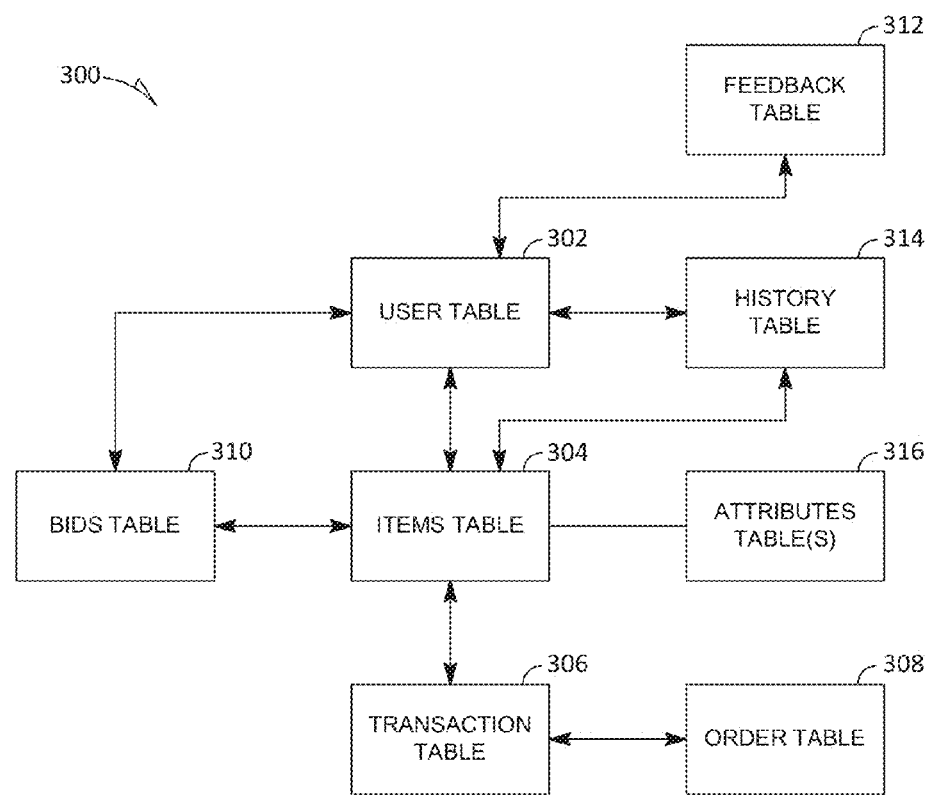
FIG. 3 is a block diagram depicting an example embodiment of various tables that may be maintained within a database.

FIG. 3 is a high-level entity-relationship diagram, illustrating various tables 300 that may be maintained within the database(s) 126, and that are utilized by and support the applications 120 and 122. A user table 302 contains a record for each registered user of the networked system 102, and may include identifier, address and financial instrument information pertaining to each such registered user. A user may operate as a seller, a buyer, or both, within the networked system 102. In one example embodiment, a buyer may be a user that has accumulated value (e.g., commercial or proprietary currency), and is accordingly able to exchange the accumulated value for items that are offered for sale by the networked system 102.

The tables 300 also include an items table 304 in which are maintained item records for goods and services that are available to be, or have been, transacted via the networked system 102. Each item record within the items table 304 may furthermore be linked to one or more user records within the user table 302, so as to associate a setter and one or more actual or potential buyers with each item record.

A transaction table 306 contains a record for each transaction (e.g., a purchase or sale transaction) pertaining to items for which records exist within the items table 304.

An order table 308 is populated with order records, each order record being associated with an order. Each order, in turn, may be associated with one or more transactions for which records exist within the transaction table 306.

Bid records within a bids table 310 each relate to a bid received at the networked system 102 in connection with an auction-format listing supported by an auction application 202. A feedback table 312 is utilized by one or more reputation applications 208, in one example embodiment, to construct and maintain reputation information concerning users. A history table 314 maintains a history of transactions to which a user has been a party. One or more attributes tables 316 record attribute information pertaining to items for which records exist within the items table 304. Considering only a single example of such an attribute, the attributes tables 316 may indicate a currency attribute associated with a particular item, the currency attribute identifying the currency of a price for the relevant item as specified by a seller.

Figure 4:
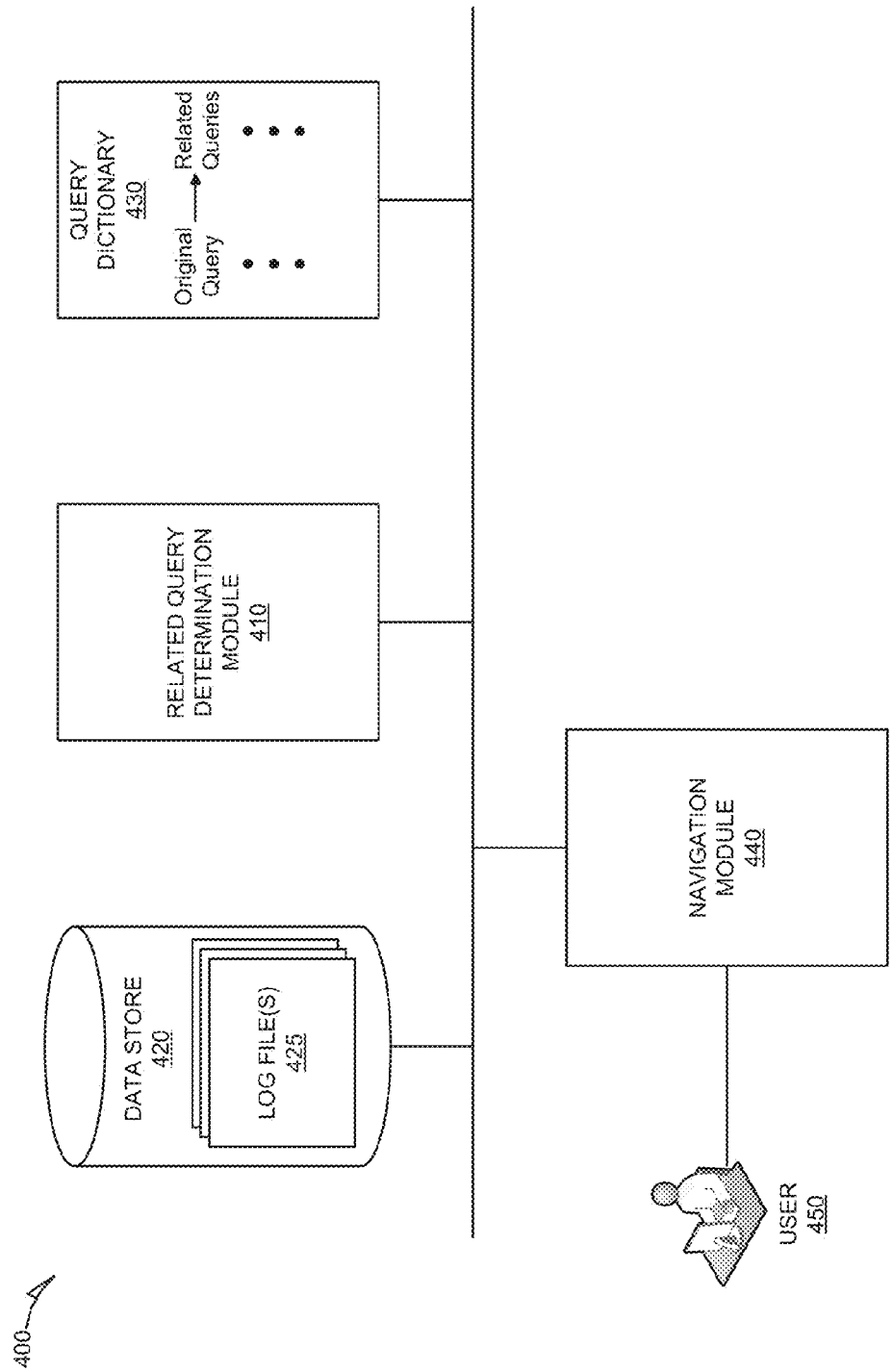
FIG. 4 is a block diagram illustrating an example embodiment of a system that provides related search queries.

FIG. 4 is a block diagram illustrating an example embodiment of a system 400 that provides related search queries. In some embodiments, some or all of the modules and components of the system 400 may be incorporated into or implemented using the components of publication system 102 in FIG. 1. For example, the modules of the system 400 may be incorporated into the one or more marketplace applications 120 and/or payment applications 122, and the data storage components of the system 400 may be incorporated into the one or more databases 126. In addition, the modules and components of FIG. 4 may have separate utility and application outside of the publication system 102 of FIG. 1.

In some embodiments, the system 400 comprises a related query determination module 410. The related query determination module 410 may be executable by one or more processors (not shown). In some embodiments, the related query determination module 410 is configured to determine one or more related search queries for an original search query based on user behavioral data that has been collected over a period of time. The user behavioral data may represent actions performed by users when presented with item listings resulting from a search query. For example, in some embodiments, such actions may include, but are not limited to, viewing an item listing, asking a question of the seller to whom an item listing belongs, adding an item listing to a watch list, and bidding on the item in an item listing, and purchasing an item in an item listing. It is contemplated that other user actions may be represented by the user behavioral data on which the determination of the related search queries is based. In some embodiments, the actions performed by users with respect to item listings comprise clicking, or otherwise selecting, a link corresponding to an item listing. However, it is contemplated that the actions may be performed in other ways as well.

In some embodiments, the related query determination module 410 operates under the concept that search queries are related if they lead to a user action on the same item listing. A measure of how related search queries are may be based on how often the search queries lead to a user action on the same item listing, the quantity of user actions performed on the same item listing, and/or the type of user actions performed on the same item listing.

The user behavioral data may be obtained by the related query determination module 410 from a variety of sources. In some embodiments, the related query determination module 410 receives the user behavioral data from a data store 420, which can store the user behavioral data. Data store 420 may comprise one or more databases (e.g., database(s) 126 in FIG. 1). In some embodiments, data store 420 may store one or more log files 425. The log files 425 may comprise information and identifiers for item listings of an e-commerce website. The log files 425 may also comprise original search queries that resulted in a user action directed towards one or more of the item listings. For example, a user may have entered the term "jet ski" in an e-commerce website's search field and been presented with several item listings, one of which is an item listing entitled "2004 Kawasaki SXR 800 Jetski." In this example, if the user selected (e.g., clicked) on the "2004 Kawasaki SXR 800 Jetski" item listing to view the item, a record of this action may be stored in a log file 425. In some embodiments, clickstream data directed towards an item listing and representing user actions may be stored in a log file 425, along with the targeted item listing and the search query from which the user action resulted. In the example above, a log file 425 may store information indicating that, for the "2004 Kawasaki SXR 800 Jetski" item listing, a user viewed the item as a consequence of performing a search on "jet ski."

In some embodiments, the item listings for which information and identifiers are stored in the data store 420 may comprise live item listings and completed item listings. A live item listing is an item listing for which the item is currently being offered. A completed item listing is an item listing for which the item is not currently being offered (e.g., the item can no longer be purchased via the item listing). In some embodiments, completed item listings may comprise an item listing that has expired, an item listing for which the item has already been sold, and an item listing that has been canceled by the seller of the item or by the e-commerce site hosting the item listing. Including completed item listings in the plurality of listings for which user behavioral data is analyzed to determine related search queries improves the quality of determining the related search queries as it provides a much bigger pool of data from which the determination may be made.

In some embodiments, the related query determination module 410 is configured to assign the determined related search queries to their corresponding original search query in a query dictionary 430. In some embodiments, query dictionary 430 is configured to store the relationship between each original search query and its corresponding related search queries. In some embodiments, assigning the determined related search queries to their corresponding original search query in the query dictionary may be part of generating the query dictionary 430. In some embodiments, assigning the determined related search queries to their corresponding original search query in the query dictionary may be part of updating the query dictionary 430.

In some embodiments, the system 400 may further comprise a navigation module 440, which may employ one or more navigation applications (e.g., navigation application(s) 214 in FIG. 2). The navigation module 440 may be executable by at least one processor and configured to receive a search query from a user 450 on a client device. If the search query submitted by the user 450 matches an original search query for which related search queries have been determined, the navigation module 440 may retrieve those related search queries determined for the matching original search query, and may provide the retrieved related search queries to the user 450 on the client device. In some embodiments, the navigation module 440 may retrieve the related search queries from the query dictionary 430. However, it is contemplated that the navigation module 440 may retrieve the related search queries from other sources, including, but not limited to, the related query determination module 410.

In some embodiments, related query determination module 410 may be configured to use a bipartite graph analysis in determining the related search queries for an original search query. The bipartite graph analysis may be based on collected information regarding original search queries submitted by users and the user behavioral data that results as a consequence of those original search query submissions. As previously discussed, this user behavioral data may comprise clickstream data for item listings. The bipartite graph analysis may model the relationships between original search queries submitted by users and the resulting item listings.

Figure 5:
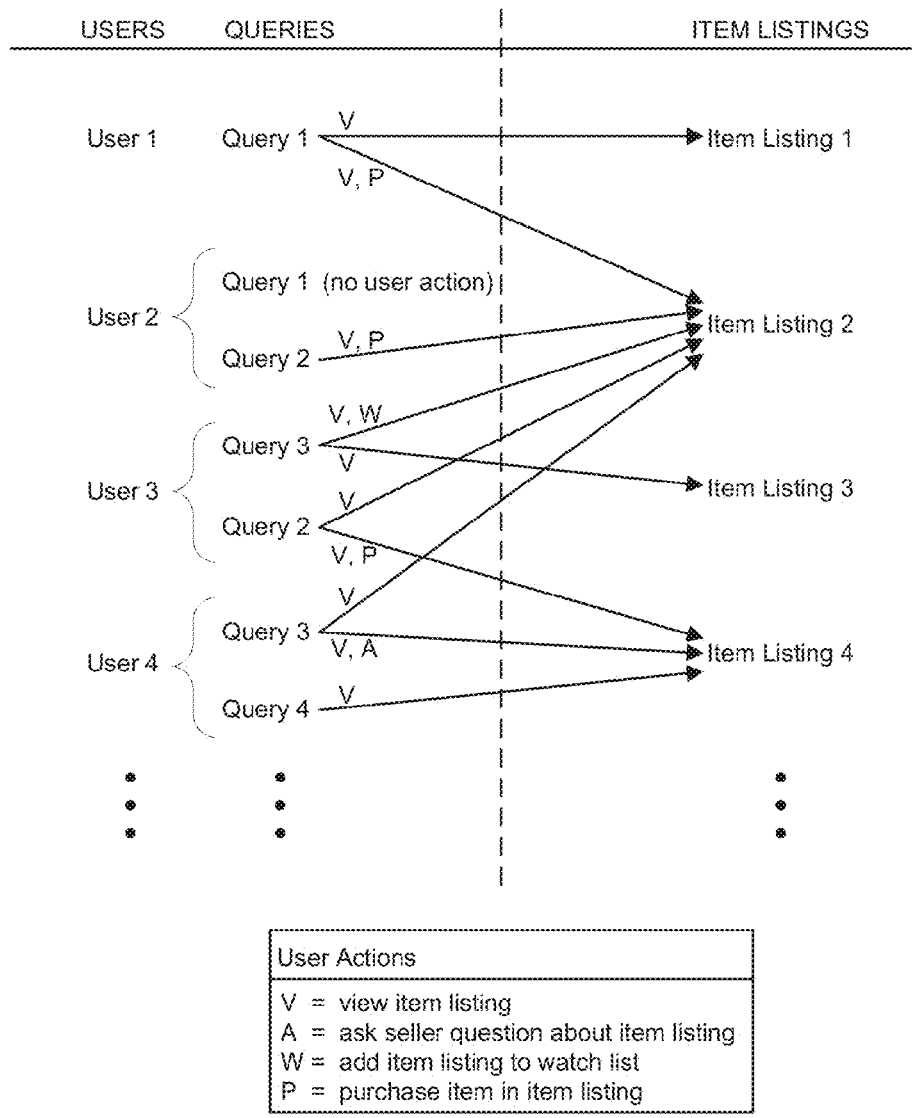
FIG. 5 illustrates an example embodiment of a bipartite graph.

FIG. 5 illustrates an example embodiment of a bipartite graph 500 showing the relationships between user-submitted queries (Query 1, Query 2, Query 3, Query 4, . . . ) and item listings (Item Listing 1, item Listing 2, Item Listing 3, item Listing 4, . . . ). In the bipartite graph 500, user actions resulting from the queries and directed towards the item listings may comprise viewing an item listing (V), asking a seller of an item listing a question (A), adding an item listing to a watch list (W), and purchasing, or submitting on offer to purchase, an item of an item listing (P). It is contemplated that other user actions are also within the scope of the present disclosure.

In bipartite graph 500, User 1 submits Query 1 on an e-commerce website and is provided with a search results page that includes multiple item listings. From the search results page for Query 1, User 1 performs an action to view Item Listing 1. From the search results page for Query 1, User 1 also performs actions to view Item Listing 2 and to purchase the item of Item Listing 2.

In bipartite graph 500, User 2 submits Query 1 on the e-commerce website and is provided with a search results page. From the search results page for Query 1, User 2 does not perform any action on any of the item listings. User 2 also submits Query 2. From the search results page for Query 2, User 2 performs actions to view item Listing 2 and to purchase the item of Item Listing 2.

In bipartite graph 500, User 3 submits Query 3 on the e-commerce website and is provided with a search results page. From the search results page for Query 3, User 3 performs actions to view Item Listing 2 and to add Item Listing 2 to a watch list. From the search results page for Query 3, User 3 also performs an action to view Item Listing 3. User 3 also submits Query 2. From the search results page for Query 2, User 3 performs an action to view Item Listing 2. From the search results page for Query 2, User 3 also performs actions to view Item Listing 4 and to purchase the item of Item Listing 4.

In bipartite graph 500, User 4 submits Query 3 on the e-commerce website and is provided with a search results page. From the search results page for Query 3, User 4 performs an action to view item Listing 2. From the search results page for Query 3, User 4 also performs actions to view Item Listing 4 and to ask the seller of the item for Item Listing 4 a question (e.g., by sending a message to the seller via a link associated with Item Listing 4). User 4 also submits Query 4. From the search results page for Query 4, User 4 performs an action to view Item Listing 4.

Bipartite graph 500 may comprise several other relationships between user-submitted queries and item listings. Accordingly, bipartite graph 500 may comprise other queries, item listings, and user actions in addition to those shown in FIG. 5.

Referring back to FIG. 4, in some embodiments, related query determination module 410 may be configured to determine the related search queries for an original search query by aggregating search queries that resulted in a user action for the same item listing and then sorting the aggregated search queries. In some embodiments, these aggregations of search queries may be formed for each item listing. The aggregation of search queries for an item listing may be formed from the original search queries that result in user actions directed towards the item listing. The aggregation may be formed based on clickstream data.

In some embodiments, sorting the search queries within an aggregation may comprise ranking the search queries in the aggregation. This ranking may be performed for each of the item listings for which there is user behavioral data available. In some embodiments, the ranking of the search queries in the aggregation of search queries may be based, at least in part, on user actions reflected in the clickstream data.

FIG. 6 illustrates an example embodiment of a ranking 600 of queries for an item listing. The ranking 600 in FIG. 6 is based on the information in the bipartite graph 500 in FIG. 5 and the search queries that resulted in user action directed towards item Listing 2. Here, Query 2 is the highest ranking search query for Item Listing 2, Query 3 is the second highest ranking search query, Query 1 is the third highest ranking search query, and Query 4 is the fourth highest ranking search query. It is contemplated that the ranking 600 may comprise other search queries as well.

In some embodiments, the ranking of the search queries in the aggregation of search queries may be based, at least in part, on the frequency of user actions resulting from them. For example, the more often a search query led to a user action, the higher the ranking that search query may have. In FIG. 6, Query 2 and Query 3 each have a greater number of user actions for Item Listing 2 than Query 1. Therefore, Query 2 and Query 3 are each ranked higher than Query 1.

In some embodiments, the ranking of the search queries in the aggregation of search queries may be based, at least in part, on the types of user actions resulting from them. For example, user actions directed towards purchasing or submitting an offer to purchase an item of an item listing may be weighted more heavily than simply viewing an item listing. In FIG. 6, although Query 2 and Query 3 each have three user actions for Item Listing 2, Query 2 resulted in a purchase of the item in Item Listing 2 after viewing Item Listing 2, whereas Query 3 resulted in adding Item Listing 2 to a watch list after viewing Item Listing 2. Therefore, since purchasing an item may be weighted more heavily in ranking than adding an item listing to a watch list, Query 2 is ranked higher in FIG. 6 than Query 3. It is contemplated that other ranking and weighting schemes are within the scope of the present disclosure.

In some embodiments, the sorted aggregations may be used to assign related search queries to original search queries in a query dictionary (e.g., query dictionary 430 in FIG. 4). In some embodiments, assigning the related search queries to their corresponding original search query in the query dictionary may be part of generating the query dictionary. In some embodiments, the query dictionary may already be generated, and assigning the related search queries to their corresponding original search query in the query dictionary may be part of updating the query dictionary.

In some embodiments, the related search queries may be assigned to their corresponding original search query based on the ranking of the related search queries. A certain (e.g., predetermined) number of the highest-ranked related search queries may be assigned to their corresponding original search query, while the lower-ranked related search queries may be omitted from being assigned to their corresponding original search query. FIG. 7 illustrates an example embodiment of a dictionary 700 of related queries for given queries. The assignments of the related search queries to the original search queries in the dictionary 700 may be based on the information in the bipartite graph 500 in FIG. 5 and the ranking 600 in FIG. 6. In dictionary 700, Query 2 and Query 3 are assigned as related search queries to Query 1. In some embodiments, Query 2 and Query 3 may be assigned as the related search queries to Query 1 based, at least in part, on their high ranking (reflected in FIG. 6), whereas Query 4 may be omitted from being assigned as one of the related search queries to Query 1 based, at least in part, on its lower ranking. A similar assignment scheme may be used for the other original search queries as well. In dictionary 700, Query 3 and Query 1 are assigned as related search queries to Query 2, and Query 2 and Query 1 are assigned as related search queries to Query 3. As a result of these assignments, in some embodiments, if a user submits one of the original search queries for a search, then the corresponding related search queries in dictionary may be presented as related search queries in the search result page, along with the item listings resulting from the submitted search query. The related search queries may be presented as selectable links, which, when selected (e.g., clicked), prompt an execution of a search on the selected related search query.

In some embodiments, the related query determination module 410 may be configured to determine that a similarity level between a recall set for one of the related search queries and a recall set for one of the original search queries exceeds a predetermined threshold. The related query determination module 410 may then omit the related search query for which the similarity level exceeds the predetermined threshold from being assigned to an original search query in the dictionary 700 in response to the similarity level exceeding the predetermined threshold. Such a determination and omission is useful for preventing the inclusion of related search queries that provide search results that are extremely similar to the search results provided by the original search query. For example, a related search query (e.g., jet skis) that is merely a pluralized version of the original search query (e.g., jet ski) may provide search results nearly identical to those of the original search query. If the search results are too similar, then the benefit of the related search result is dramatically reduced, as it will not provide the user with enough additional search results beyond those of the original search query.

In some embodiments, aggregations and rankings across multiple item listings may be used to determine which related search queries to assign to an original search query. For example, while the ranking 600 of search queries for Item Listing 2 in FIG. 6 shows the descending order being Query 2, Query 3, Query 1, Query 4, . . . , a ranking of search queries for another item listing (e.g., Item Listing 8, which is not shown) may have different rankings for the search queries. As a result, in some embodiments, the assignment of a related search query to an original search query may be based on the multiple rankings of the related search query across multiple item listings for which user actions were performed as a consequence of the related search query and as a consequence of the original search query.

Figure 8:
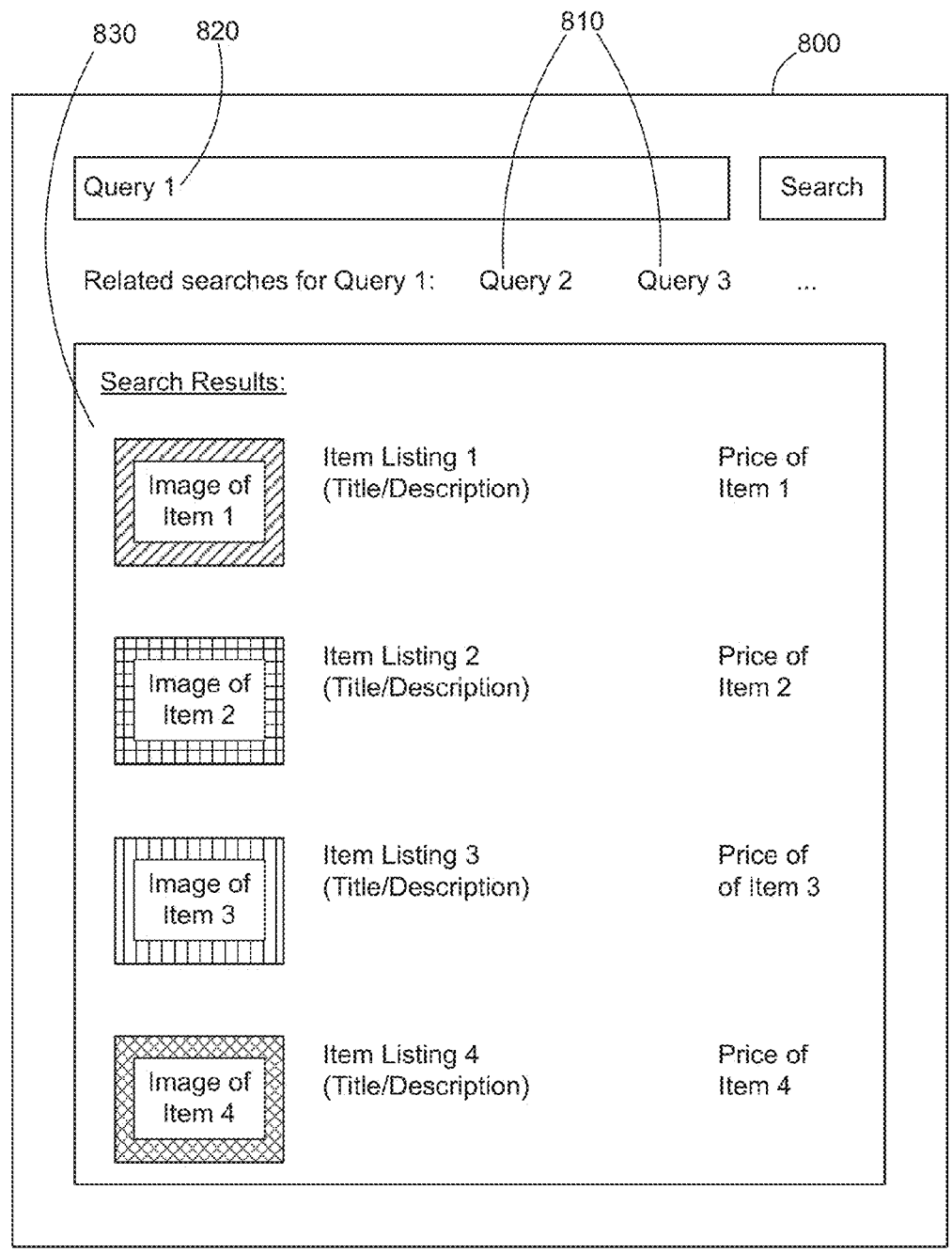
FIG. 8 illustrates an example embodiment of an e-commerce web page presenting related search queries to a user in response to the user submitting an original search query.

FIG. 8 illustrates an example embodiment of an e-commerce web page 800 presenting related search queries 810 to a user in response to the user submitting an original search query 820. The web page 800 may be a search results page that provides search results 830 to the user in response to the user submitting the original search query (e.g., Query 1). The search results 830 may comprise multiple item listings (e.g., Item Listing 1, Item Listing 2, etc.). The item listings may be represented or identified by a title and/or a description of the corresponding item. The search results may also comprise an image of the corresponding item for each item listing (e.g., Image of Item 1, Image of Item 2, etc.), as well as a price of the corresponding item for each item listing (e.g., Price of Item 1, Price of Item 2, etc.). When the user submits the original search query 820, the e-commerce web site may employ a system (e.g., system 400 of FIG. 4) to determine the related search queries 810 to present to the user. In some embodiments, the original search query 820 may be used by the system to retrieve the related search queries 810 from a query dictionary (e.g., query dictionary 700 in FIG. 7). In one example, a user may submit "jet ski" as the original search query 820, and be presented with "personal watercraft" and "waverunner" as related search queries 810. In some embodiments, the related search queries 810 may each be presented as a selectable link, which, when selected (e.g., clicked), prompt an execution of a search on the selected related search query 810. For example, clicking on Query 3 in web page 800 prompt the system to perform a search using Query 3 as the search query.

Figure 9:
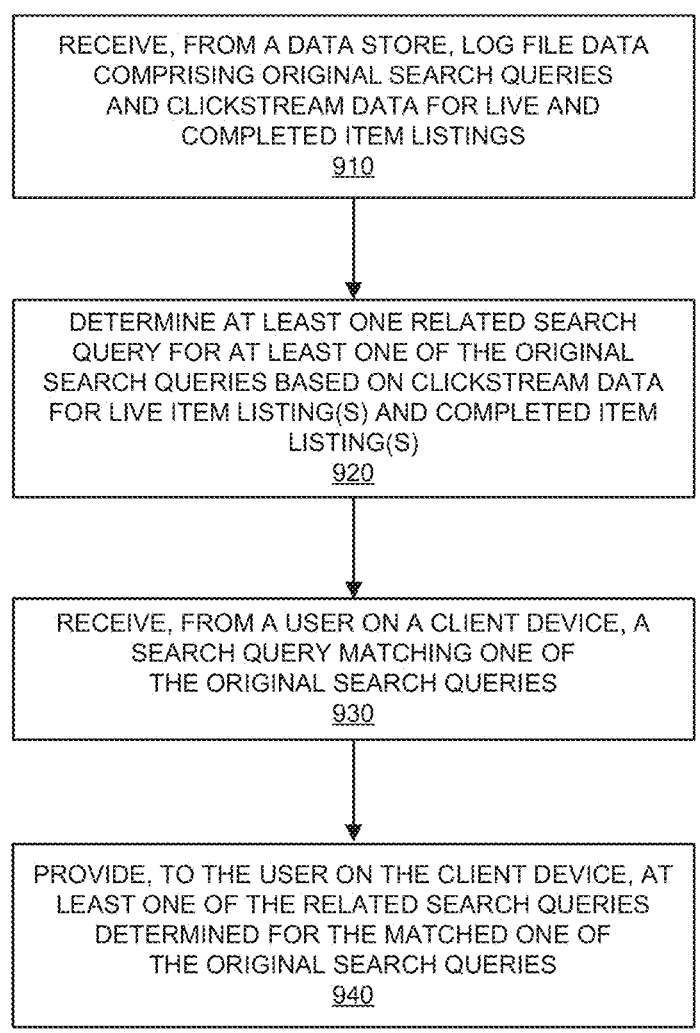
FIG. 9 is a flowchart illustrating an example embodiment of method of providing related search queries for given search queries.

FIG. 9 is a flowchart illustrating an example embodiment of a method 900 of providing related search queries for given search queries. The operations of method 900 may be performed by a system or modules of a system (e.g., system 400 or any of its modules). At operation 910, log file data may be received from a data store. The log file data may comprise original search queries and clickstream data for a plurality of e-commerce item listings. The plurality of e-commerce item listings may comprise live item listings and completed item listings. At operation 920, at least one related search query may be determined for at least one of the original search queries based on clickstream data for at least one of the live item listings and clickstream data for at least one of the completed item listings. At operation 930, a search query may be received from a user on a client device. The search query may match one of the original search queries. At operation 940, at least one of the search queries that was determined to be a related search query for the matched one of the original search queries may be provided to the user on the client device.

Figure 10:
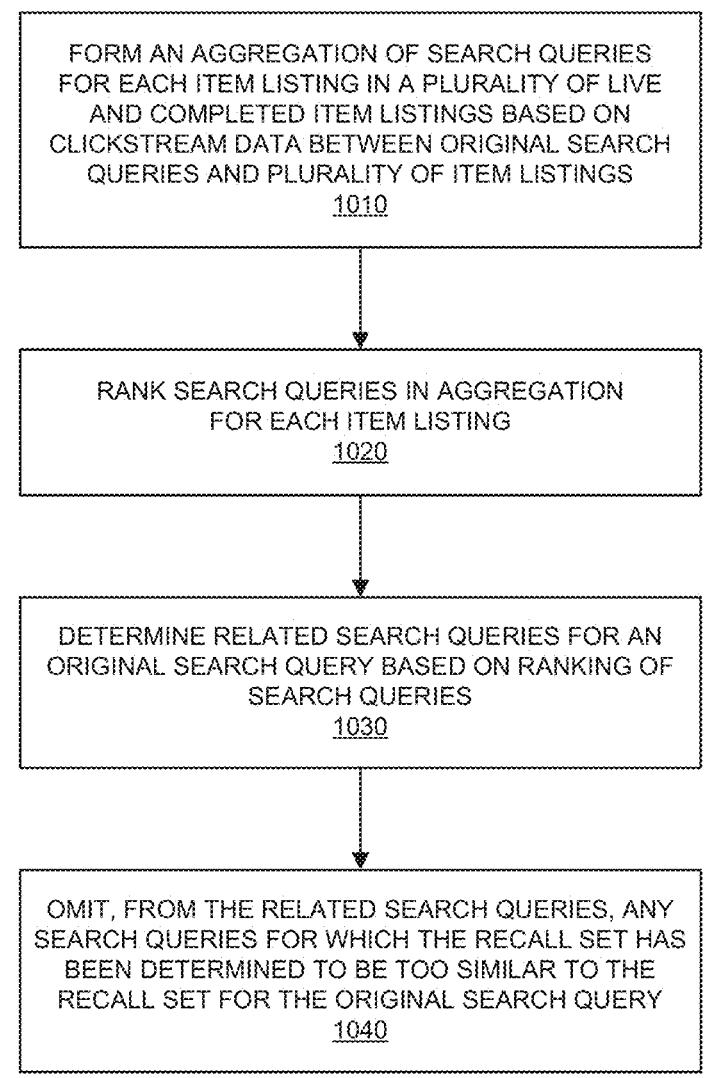
FIG. 10 is a flowchart illustrating an example embodiment of a method of determining related search queries for given search queries.

FIG. 10 is a flowchart illustrating an example embodiment of a method 1000 of determining related search queries for given search queries. The operations of method 1000 may be performed by a system or modules of a system (e.g., system 400 or any of its modules). At operation 1010, an aggregation of search queries may be formed for each item listing in a plurality of live and completed item listings. The aggregation of search queries for an item listing may be based on clickstream data between original search queries and the item listing. At operation 1020, the search queries in the aggregation of search queries may be ranked for each of the item listings in the plurality live and completed item listings. In some embodiments, the ranking of the search queries in the aggregation of search queries is based, at least in part, on user actions reflected in the clickstream data. In some embodiments, the ranking of the search queries in the aggregation of search queries is based, at least in part, on the frequency of user actions reflected in the clickstream data and/or the type of user actions reflected in the clickstream data. At operation 1030, related search queries for an original search query may be determined based on the ranking of the search queries. At operation 1040, a similarity level between a recall set for one of the related search queries and a recall set for the original search query may be determined to exceed a predetermined threshold, and the related search query for which the similarity level exceeds the predetermined threshold may be omitted from being assigned to an original search query in a dictionary in response to the similarity level exceeding the predetermined threshold.

In some embodiments, related search queries may be provided for an item listing. The related search queries may be provided to a user being presented with the item listing. In some embodiments, the related search queries may be displayed on an item listing page that comprises an item listing. The related search queries for an item listing may be determined based on user behavioral data (e.g., clickstream data). However, newly listed item listings have little or no user behavioral data on which to base a determination of related search queries. This situation arises with e-commerce sites that have a preponderance of new and unique items having a quick turnover (e.g., eBay), as opposed to e-commerce sites that have product catalogs that do not change frequently (e.g., Amazon.com and Wal-Mart).

The present disclosure may provide a solution to the lack of user behavioral data for these new item listings. In some embodiments, related search queries for one or more old item listings (i.e., item listings having at least a minimum threshold amount of user behavioral data) may be used to infer related search queries for a new item listing (i.e., an item listing having less than the minimum threshold amount of user behavioral data). Given a new item listing with little or no user behavioral data, old item listings that are similar to the new item listing may be found. Similarity between an old item listing and a new item listing may be determined based a comparison of one or more item listing features for the old item listing and the new item listing. These item listing features may include, but are not limited to, category data, title data, or structured item data (e.g., name:value pairs), image data, seller data, or price data. Related search queries for old item listings that have been determined to be similar to the new item listing may be associated and/or displayed with the new item listing.

Figure 11:
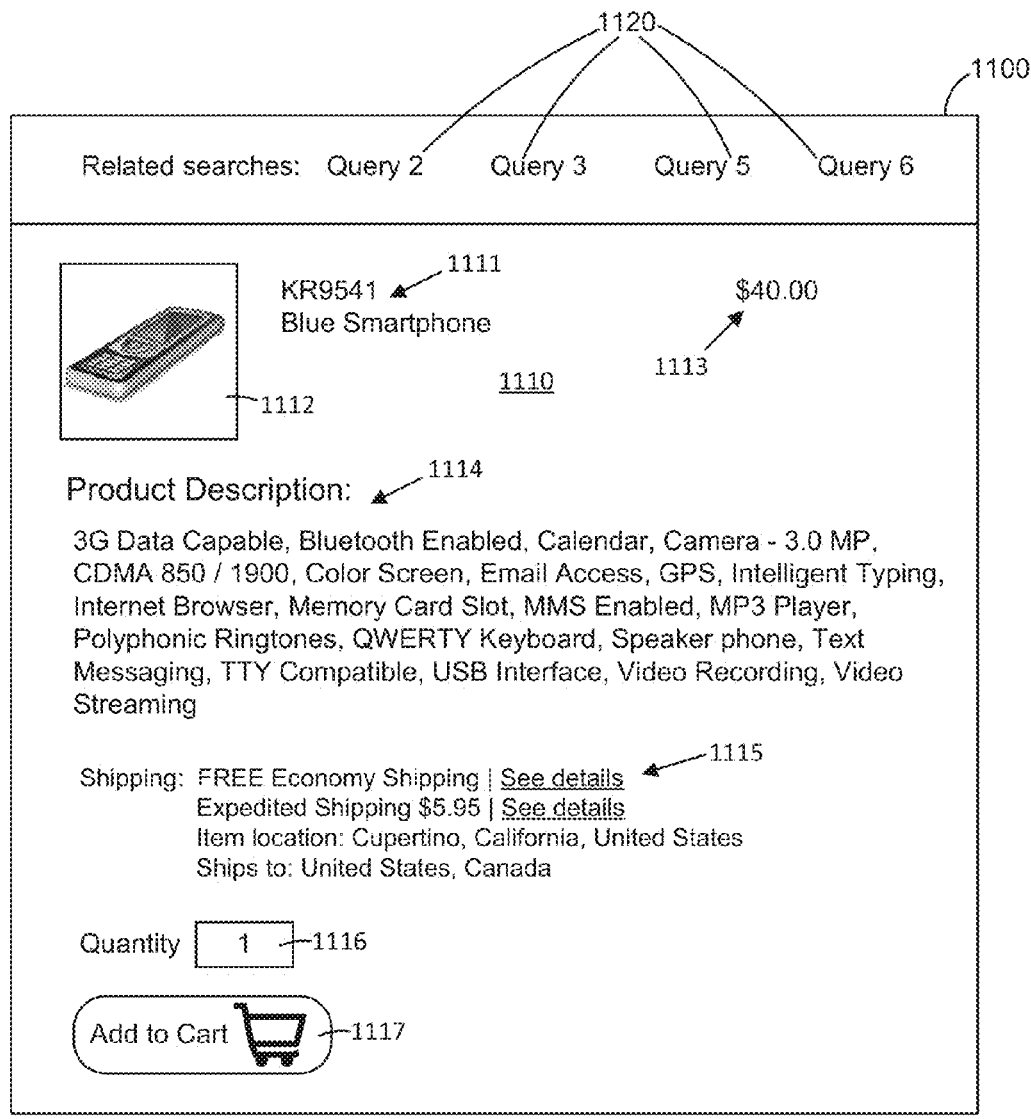
FIG. 11 illustrates an example embodiment of an item listing page presenting related search queries.

FIG. 11 illustrates an example embodiment of an item listing page 1100 presenting related search queries 1120. The item listing page 1100 may be provided in response to a user selecting (e.g., clicking) a search result in a search results page (e.g., one of the search results 830 in FIG. 8). The item listing page 1100 may comprise an item listing 1110. The item listing 1110 may comprise a title or name 1111 for the item of the item listing 1110, an image 1112 of the item, a price 1113 of the item, a product description 1114, and shipping options 1115 for the item. In some embodiments, the item listing 1110 may also comprise a quantity field 1116 for a user to enter a quantity of the item the user wants to purchase, as well as a selectable "Add to Cart" button 1117 for a user to add the entered quantity of the item to a shopping cart. It is contemplated that other configurations of the item listing page 1100 and the item listing 1110 are within the scope of the present disclosure.

Referring back to FIG. 4, in some embodiments, the related query determination module 410 may be configured to identify a new e-commerce item listing based on a determination that the new e-commerce item listing lacks a predetermined minimum amount of clickstream data. The related query determination module 410 also may be configured to determine similar e-commerce item listings for the new e-commerce item listing from a plurality of old e-commerce item listings based on at least one item feature of the new e-commerce item listing and the plurality of old e-commerce item listings. The plurality of old e-commerce item listings may comprise live e-commerce item listings and completed e-commerce item listings. Each old e-commerce item listing may have at least the predetermined minimum amount of clickstream data. In some embodiments, the item features upon which the determination of similar e-commerce item listings is based may comprise category data, title data, or structured item data, image data, seller data, or price data. However, it is contemplated that other types of item features may be used as well. In some embodiments, multiple types of item features are used to determine similar e-commerce item listings for the new e-commerce item listing.

The related query determination module 410 may further be configured to associate related search queries of the similar e-commerce item listings with the new e-commerce item listing, and to provide, to a user on a client device, the related search queries for the new e-commerce item listing along with the new e-commerce item listing (e.g., as shown in FIG. 11). In some embodiments, associating the related search queries of the similar e-commerce item listings with the new e-commerce item listing may comprise storing these associations in one or more data storage device (e.g., database(s) 126 in FIG. 1 or data store 420 in FIG. 4). In some embodiments, these associations may be accessed and retrieved later when providing related search queries for a new item listing when presenting the new item listing to a user.

In some embodiments, the related query determination module 410 may be further configured to receive log file data 425 from the data store 420. The log file data may comprise original search queries and clickstream data for the old e-commerce item listings. The related query determination module 410 may also be configured to determine the related search queries for each of the old e-commerce item listings based on the original search queries and the clickstream data for the old e-commerce item listings. In some embodiments, operations previously discussed with respect to determining one or more related search queries for an original search query (e.g., the operations discussed with respect to FIGS. 5-10), or variations on those operations, may be used to determine the related search queries for each of the old e-commerce item listings. Referring back to FIG. 6, a ranking 600 of the search queries that resulted in user action directed towards Item Listing 2 is illustrated. In some embodiments, search queries that are determined to be ranked high enough (e.g., meeting a ranking threshold) may be determined to be the related search queries for the item listing.

In some embodiments, determining the related search queries for each of the old e-commerce item listings comprises forming an aggregation of search queries for each of the old e-commerce item listings. The aggregation of search queries for an old e-commerce item listing may be formed from the original search queries and be based on clickstream data between the original search queries and the old e-commerce item listing. Determining the related search queries for each of the old e-commerce item listings may also comprise ranking the search queries in the aggregation of search queries for each of the old e-commerce item listings. In some embodiments, the ranking of the search queries in the aggregation of search queries may be based, at least in part, on user actions reflected in the clickstream data. In some embodiments, the ranking of the search queries in the aggregation of search queries may be based, at least in part, on a frequency of user actions reflected in the clickstream data. In some embodiments, the user actions reflected in the clickstream data may comprise a user viewing an item listing and a user submitting an offer to purchase an item in the item listing.

FIGS. 12A-12B illustrate an example embodiment of associating related queries for similar item listings with a new item listing. FIG. 12A shows a table 1200a of related search queries for item listings. In FIG. 12A, item listing 1, item listing 2, and item listing 3 are old item listings, each having at least a predetermined minimum amount of user behavioral data. Item listing 1 is a live item listing having related search queries Query 2 and Query 3. Item listing 2 is a live item listing having related search queries Query 4 and Query 1. Item listing 3 is a completed item listing having related search queries Query 5 and Query 6. Item listing 4 is a new item listing having less than the predetermined minimum amount of user behavioral data. As a result of having less than the predetermined minimum amount of user behavioral data, new item listing 4 has no related search queries.

Item listings 1 and 3 may be determined to be sufficiently similar to item listing 4. As previously discussed, this determination may be based on a comparison of at least one item feature of the new item listing, item listing 4, and of the old item listings, item listings 1, 2, and 3. In some embodiments, the item features upon which the determination of similar item listings is based may comprise category data, title data, or structured item data, image data, seller data, or price data. However, it is contemplated that other types of item features may be used as well. In some embodiments, multiple types of item features are used to determine similar item listings for the new item listing.

As previously discussed, the related search queries for the similar item listings, item listings 1 and 3, may be associated with the new item listing, item listing 4. FIG. 12B shows a table 1200b of related search queries for item listings. In the table 1200b, the relates search queries of item listing 1 and item listing 3 are associated with new item listing 4. As a result, related search queries Query 2, Query 3, Query 5, and Query 6 are associated with new item listing 4. In some embodiments, this association may be implemented in a storage device and later accessed when providing related search queries for the new item listing when presenting the new item listing to a user.

Figure 13:
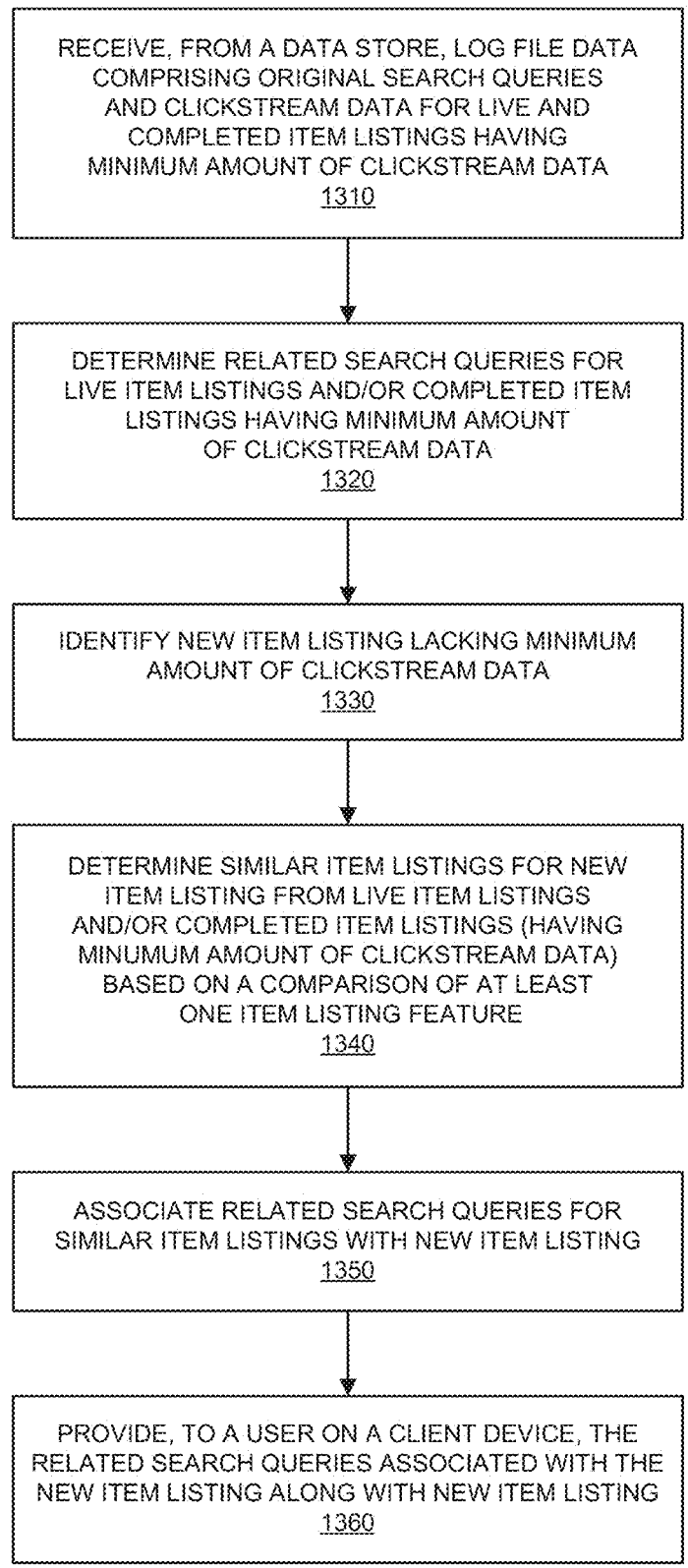
FIG. 13 is a flowchart illustrating an example embodiment of a method of determining related search data for a new item listing.

FIG. 13 is a flowchart illustrating an example embodiment of a method 1300 of determining related search data for a new item listing. At operation 1310, log file data may be received from a data store. The log file data may comprise original search queries and clickstream data for a plurality of item listings. The plurality of item listings may comprise live item listings and completed item listings. Each one of the item listings may have a predetermined minimum amount of clickstream data. At operation 1320, related search queries may be determined for the live item listings and/or the completed item listings based on their clickstream data. At operation 1330, a new item listing may be identified based on a determination that the new item listing lacks a predetermined minimum amount of clickstream data. At operation 1340, similar item listings for the new item listing may be determined from the plurality of live and/or completed item listings based on at least one item feature of the new item listing and the plurality of live and/or completed item listings. At operation 1350, related search queries of the similar item listings may be associated with the new item listing. At operation 1360, the related search queries for the new item listing may be provided along with the new item listing to a user on a client device. It is contemplated that method 1300 and any of its operations may incorporate any of the features disclosed within the present disclosure.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 14:
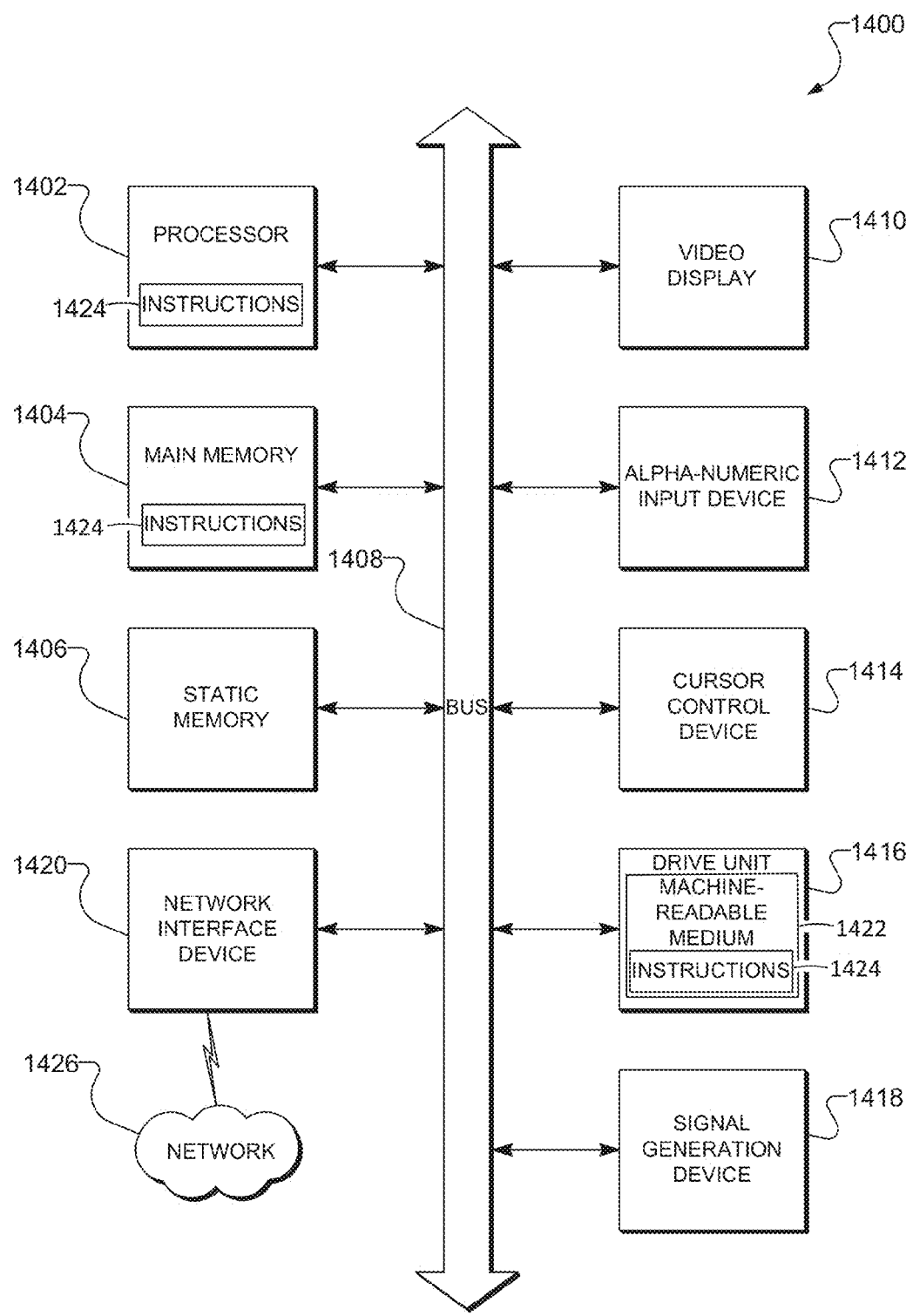
FIG. 14 shows a diagrammatic representation of a machine in the example form of a computer system within which a set of instructions may be executed to cause the machine to perform any one or more of the methodologies discussed herein.

FIG. 14 is a block diagram of a machine in the example form of a computer system 1400 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 includes a processor 1402 (e.g., a central processing unit (CPU), a graphics processing unit (CPU) or both), a main memory 1404 and a static memory 1406, which communicate with each other via a bus 1408. The computer system 1400 may further include a video display unit 1410 (e.g., a liquid crystal display (LCD) or a cathode ray tube (CRT)). The computer system 1400 also includes an alphanumeric input device 1412 (e.g., a keyboard), a user interface (UI) navigation (or cursor control) device 1414 (e.g., a mouse), a disk drive unit 1416, a signal generation device 1418 (e.g., a speaker) and a network interface device 1420.

Machine-Readable Medium

The disk drive unit 1416 includes a machine-readable medium 1422 on which is stored one or more sets of data structures and instructions 1424 (e.g., software) embodying or utilized by any one or more of the methodologies or functions described herein. The instructions 1424 may also reside, completely or at least partially, within the main memory 1404 and/or within the processor 1402 during execution thereof by the computer system 1400, the main memory 1404 and the processor 1402 also constituting machine-readable media. The instructions 1424 may also reside, completely or at least partially, within the static memory 1406.

While the machine-readable medium 1422 is shown in an example embodiment to be a single medium, the term "machine-readable medium" may include a single medium or multiple media (e.g., a centralized or distributed database, and/or associated caches and servers) that store the one or more instructions 1424 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 1424 may further be transmitted or received over a communications network 1426 using a transmission medium. The instructions 1424 may be transmitted using the network interface device 1420 and any one of a number of well-known transfer protocols (e.g., HTTP). Examples of communication networks include a LAN, a WAN, the Internet, mobile telephone networks, POTS networks, and wireless data networks (e.g., WiFi and WIMAX networks). The term "transmission medium" shall be taken to include any intangible medium capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   at least one processor; and
   a related query determination module, executable by the at least one processor, configured to:
      receive log file data from a data store, the log file data comprising original search queries and clickstream data for a plurality of old e-commerce item listings;
      determine related search queries for each of the old e-commerce item listings based on the original search queries and the clickstream data for the old e-commerce item listings, the determining the related search queries for each of the old e-commerce item listings comprising:
         forming an aggregation of search queries for each of the old e-commerce item listings, the aggregation of search queries for an old e-commerce item listing being formed from the original search queries and being based on clickstream data between the original search queries and the old e-commerce item listing; and
         ranking the search queries in the aggregation of search queries for each of the old e-commerce item listings;

identify a new e-commerce item listing based on a determination that the new e-commerce item listing lacks a predetermined minimum amount of clickstream data;

determine similar e-commerce item listings for the new e-commerce item listing from the plurality of old e-commerce item listings based on at least one item feature of the new e-commerce item listing and the plurality of old e-commerce item listings, the plurality of old e-commerce item listings comprising live e-commerce item listings and completed e-commerce item listings, each old e-commerce item listing having at least the predetermined minimum amount of clickstream data;

associate the related search queries of the similar e-commerce item listings with the new e-commerce item listing; and provide, to a user on a client device, the related search queries for the new e-commerce item listing along with the new e-commerce item listing.

2. The system of claim 1, wherein the at least one item feature comprises category data, title data, or structured item data, image data, seller data, or price data.

3. The system of claim 1, wherein the ranking of the search queries in the aggregation of search queries is based, at least in part, on user actions reflected in the clickstream data.

4. The system of claim 3, wherein the ranking of the search queries in the aggregation of search queries is based, at least in part, on a frequency of user actions reflected in the clickstream data.

5. The system of claim 4, wherein the user actions reflected in the clickstream data comprise a user viewing an item listing and a user submitting an offer to purchase an item in the item listing.

6. A computer-implemented method comprising:

receiving log file data from a data store, the log file data comprising original search queries and clickstream data for a plurality of old e-commerce item listings;

determining related search queries for each of the old e-commerce item listings based on the original search queries and the clickstream data for the old e-commerce item listings, the determining the related search queries for each of the old e-commerce item listings comprising:

forming an aggregation of search queries for each of the old e-commerce item listings, the aggregation of search queries for an old e-commerce item listing being formed from the original search queries and being based on clickstream data between the original search queries and the old e-commerce item listing; and ranking the search queries in the aggregation of search queries for each of the old e-commerce item listings;

identifying a new e-commerce item listing based on a determination that the new e-commerce item listing lacks a predetermined minimum amount of clickstream data;

determining similar e-commerce item listings for the new e-commerce item listing from the plurality of old e-commerce item listings based on at least one item feature of the new e-commerce item listing and the plurality of old e-commerce item listings, the plurality of old e-commerce item listings comprising live e-commerce item listings and completed e-commerce item listings, each old e-commerce item listing having at least the predetermined minimum amount of clickstream data;

associating the related search queries of the similar e-commerce item listings with the new e-commerce item listing; and providing, to a user on a client device, the related search queries for the new e-commerce item listing along with the new e-commerce item listing.

7. The method of claim 6, wherein the at least one item feature comprises category data, title data, or structured item data, image data, seller data, or price data.

8. The method of claim 6, wherein the ranking of the search queries in the aggregation of search queries is based, at least in part, on user actions reflected in the clickstream data.

9. The method of claim 8, wherein the ranking of the search queries in the aggregation of search queries is based, at least in part, on a frequency of user actions reflected in the clickstream data.

10. The method of claim 9, wherein the user actions reflected in the clickstream data comprise a user viewing an item listing and a user submitting an offer to purchase an item in the item listing.

11. A non-transitory machine-readable storage device storing a set of instructions that, when executed by at least one processor, causes the at least one processor to perform operations comprising:

receiving log file data from a data store, the log file data comprising original search queries and clickstream data for a plurality of old e-commerce item listings;

determining related search queries for each of the old e-commerce item listings based on the original search queries and the clickstream data for the old e-commerce item listings, the determining the related search queries for each of the old e-commerce item listings comprising:

forming an aggregation of search queries for each of the old e-commerce item listings, the aggregation of search queries for an old e-commerce item listing being formed from the original search queries and being based on clickstream data between the original search queries and the old e-commerce item listing; and ranking the search queries in the aggregation of search queries for each of the old e-commerce item listings;

identifying a new e-commerce item listing based on a determination that the new e-commerce item listing lacks a predetermined minimum amount of clickstream data;

determining similar e-commerce item listings for the new e-commerce item listing from the plurality of old e-commerce item listings based on at least one item feature of the new e-commerce item listing and the plurality of old e-commerce item listings, the plurality of old e-commerce item listings comprising live e-commerce item listings and completed e-commerce item listings, each old e-commerce item listing having at least the predetermined minimum amount of clickstream data;

associating the related search queries of the similar e-commerce item listings with the new e-commerce item listing; and providing, to a user on a client device, the related search queries for the new e-commerce item listing along with the new e-commerce item listing.

12. The device of claim 11, wherein the at least one item feature comprises category data, title data, or structured item data, image data, seller data, or price data.

13. The device of claim 11, wherein the ranking of the search queries in the aggregation of search queries is based, at least in part, on user actions reflected in the clickstream data.

14. The device of claim 13, wherein the ranking of the search queries in the aggregation of search queries is based, at least in part, on a frequency of user actions reflected in the clickstream data.

* * * * *